United States Patent
Hazen et al.

(10) Patent No.: US 6,464,736 B1
(45) Date of Patent: *Oct. 15, 2002

(54) RECRYSTALLIZATION PROCESS

(75) Inventors: Wayne C. Hazen, Denver; Dale Lee Denham, Jr., Arvada; David R. Baughman, Golden, all of CO (US); Rudolph Pruszko, Dubuque, IA (US)

(73) Assignee: Environmental Projects, Inc., Casper, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/521,828

(22) Filed: Mar. 9, 2000

Related U.S. Application Data
(60) Provisional application No. 60/147,532, filed on Aug. 5, 1999.

(51) Int. Cl.[7] .............................. B01D 9/00; C13K 1/10; C30B 17/00; C01D 7/24; C01D 7/40
(52) U.S. Cl. ...................... 23/295 R; 23/298; 23/301; 23/302 T; 23/302 R
(58) Field of Search .................. 23/301, 302 T, 23/302 R, 295 R, 298; 423/206.2, 421, 425, 422, 427, 426

(56) References Cited

U.S. PATENT DOCUMENTS

| | | | |
|---|---|---|---|
| 2,330,221 A | 9/1943 | Kermer | 23/295 |
| 2,792,282 A | 9/1957 | Pike | 23/38 |
| 2,962,348 A | 11/1960 | Seglin et al. | 23/31 |
| 2,970,037 A | 1/1961 | Caldwell et al. | 23/63 |
| 2,981,600 A | 4/1961 | Porter | 23/143 |
| 3,061,409 A | 10/1962 | Robson et al. | 23/63 |
| 3,233,983 A | 2/1966 | Bauer et al. | 23/300 |
| 3,236,590 A | 2/1966 | Sopchak et al. | 23/63 |
| 3,244,476 A | 4/1966 | Smith | 23/63 |
| 3,273,959 A | 9/1966 | Miller | 23/63 |
| 3,314,748 A | 4/1967 | Howard et al. | 23/63 |
| 3,425,795 A | 2/1969 | Howard et al. | 23/63 |
| 3,479,133 A | 11/1969 | Warzel | 23/63 |
| 3,498,744 A | 3/1970 | Frint et al. | 23/63 |

(List continued on next page.)

FOREIGN PATENT DOCUMENTS

| | | |
|---|---|---|
| BE | 661071 | 7/1965 |
| EP | 0073085 B1 | 12/1986 |

OTHER PUBLICATIONS

Clay, S.E., "Kinetic Study of the Dissolution of Calcined Trona Ore in Aqueous Solutions", *Minerals and Metallurgical Processing*, Nov. 1985, 236–40.

Muraoka, D., "Monohydrate Process for Soda Ash from Wyoming Trona," *Minerals and Metallurgical Processing*, May 1985, 102–03.

American Society for Testing and Materials, "Standard Test Methods for Chemical Analysis of Soda Ash (Sodium Carbonate)", E–359–90, Mar. 1990, 403–410.

*Primary Examiner*—Wayne A. Langel
*Assistant Examiner*—Jonas N. Strickland
(74) *Attorney, Agent, or Firm*—Sheridan Ross P.C.

(57) ABSTRACT

The present invention provides a process for producing crystals of a polymorphic compound in a first crystal structure by introduction of the compound in a second crystal structure into a saturated brine solution of the compound under conditions in which formation of the first crystal structure is favored and without evaporation or changes in temperature. As the second crystal structure dissolves, the brine becomes supersaturated resulting in relief of supersaturation by formation of crystals of the first crystal structure. The process includes controlling supersaturation and its relief to achieve growth of existing crystals of the first crystal structure rather than nucleation and formation of new crystals. The resulting crystals are separated from insoluble impurities on a size separation basis.

37 Claims, 2 Drawing Sheets

U.S. PATENT DOCUMENTS

| | | | |
|---|---|---|---|
| 3,653,848 A * | 4/1972 | Port et al. .................. | 23/302 |
| 3,705,790 A | 12/1972 | Garofano et al. ............ | 23/302 |
| 3,717,698 A | 2/1973 | Ilardi et al. ................. | 423/206 |
| 3,796,794 A | 3/1974 | Ilardi et al. ................. | 423/421 |
| 3,819,805 A | 6/1974 | Graves et al. .............. | 423/206 |
| 3,836,628 A | 9/1974 | Ilardi et al. ................. | 423/206 |
| 3,845,119 A | 10/1974 | Duke et al. ................ | 260/527 |
| 3,904,733 A | 9/1975 | Gancy et al. ............... | 423/206 |
| 3,933,977 A | 1/1976 | Ilardi et al. ................. | 423/206 |
| 3,956,457 A | 5/1976 | Port et al. ................... | 423/206 |
| 4,021,527 A | 5/1977 | Baadsgaard ................ | 423/206 |
| 4,022,868 A | 5/1977 | Poncha ...................... | 423/184 |
| 4,083,939 A | 4/1978 | Lobunez et al. ............ | 423/421 |
| 4,138,312 A | 2/1979 | Gill et al. .................... | 162/30 |
| 4,183,901 A | 1/1980 | Ilardi et al. ................. | 423/206 |
| 4,202,667 A | 5/1980 | Conroy et al. .............. | 23/302 |
| 4,260,594 A | 4/1981 | Verlaeten et al. ........... | 423/421 |
| 4,283,277 A | 8/1981 | Brison et al. ............... | 209/166 |
| 4,286,967 A | 9/1981 | Booth, Jr. et al. ........... | 23/298 |
| 4,288,419 A | 9/1981 | Copenhafer et al. ........ | 423/190 |
| 4,299,799 A | 11/1981 | Ilardi et al. ................. | 423/206 |
| 4,374,102 A | 2/1983 | Connelly et al. ........... | 423/206 |
| 4,472,280 A | 9/1984 | Keeney ....................... | 210/666 |
| 4,781,899 A | 11/1988 | Rauh et al. ................. | 423/206 |
| 5,300,123 A * | 4/1994 | Grott .......................... | 23/303 |
| 5,396,863 A | 3/1995 | Ninane et al. .............. | 117/206 |
| 6,284,005 B1 * | 9/2001 | Hazen et al. ................ | 23/302 |

* cited by examiner

RECRYSTALLIZATION PROCESS

CROSS-REFERENCE TO RELATED APPLICATIONS

This application claims priority from U.S. Provisional Application Serial No. 60/147,532, filed Aug. 5, 1999, entitled "RECRYSTALLIZATION PROCESS."

FIELD OF THE INVENTION

The present invention relates to the production of purified crystals from a polymorphic compound containing impurities.

BACKGROUND OF THE INVENTION

One common method of purifying a compound is to crystallize the compound in a solution. Methods of crystallization typically involve controlling macroscopic external variables such as evaporating solvent to create supersaturation or adjusting the temperature of the solvent to affect solubility. These crystallization methods are generally directed to achieving maximum solids recovery and/or purification without any regard to the size or shape of the crystals.

Therefore, there is a need for a crystallization process that can effectively control or influence the ratio of crystal growth to formation of new crystals at low energy costs.

SUMMARY OF THE INVENTION

The present invention is based on the discovery that some chemical compounds having multiple crystal forms (i.e., polymorphic compounds) have unexpectedly high dissolution rates and have unexpectedly stable supersaturation capacities under appropriate conditions that can be rapidly relieved by the introduction of crystal surfaces of the polymorphic compound in a first crystal structure to produce relatively large crystals of the compound at high rates of crystal growth. Some of these compounds occur naturally in deposits, such as evaporite deposits. The resulting crystals which are larger than insoluble impurities can be readily separated from insoluble impurities on a size separation basis.

A common procedure for processing such ores is to dissolve the mineral to be recovered and separate the insoluble impurities by clarification methods, such as thickening and/or filtration. The water added in the process must be removed, generally by expensive methods, such as evaporation.

More particularly, the process of the present invention is for producing a polymorphic compound in a first crystal structure from a feedstream which includes in a second crystal structure and insoluble impurities. The process includes adding the feedstream to a saturated brine of the compound under conditions to create supersaturation of at least about 5 g/l. The process further includes processing within parameters that preferentially relieve the supersaturation by rapid growth of existing crystals of the compound in the first crystal structure rather than by nucleation. In this manner, the particle size distribution of crystals is controlled to achieve a desired distribution of crystal size product which is coarse enough that it can be separated from the insoluble impurities on a size basis. The crystals of the compound in the first crystal structure produced by the process are recovered from the saturated brine solution.

The process can include the use of a high feed rate of at least about 100 grams of feedstream per minute for each liter of solution in the crystallizer. The process can also include relieving the supersaturation preferentially by rapid growth of existing crystals of the compound in the first crystal structure over nucleation by adding seed crystals of the compound in the first crystal structure to the saturated brine solution of the compound. Such seed crystals can be produced by removing crystals of the compound in the first crystal structure from the brine solution and sizing the removed crystals to produce a seed crystal size fraction for reintroduction to the brine solution, by producing the seed crystals separately, and/or by grinding or partial dissolution of part of the product. In a preferred embodiment, the particle size of the feedstream is less than about 150 mesh and the particle size of the seed crystals is from about 100 mesh to about 150 mesh.

Relief of supersaturation preferentially by rapid growth of existing crystals of the compound in the first crystal structure over nucleation can alternatively be achieved by a variety of methods. Such methods can include maintaining a solids content of at least about 40% in the crystallizer, agitating the brine solution at an agitation index of at least about 4, periodically lowering the temperature of the brine solution by at least about 5° C., or pausing feedstream addition at least about 60% of the time of crystallization.

Figure 1:
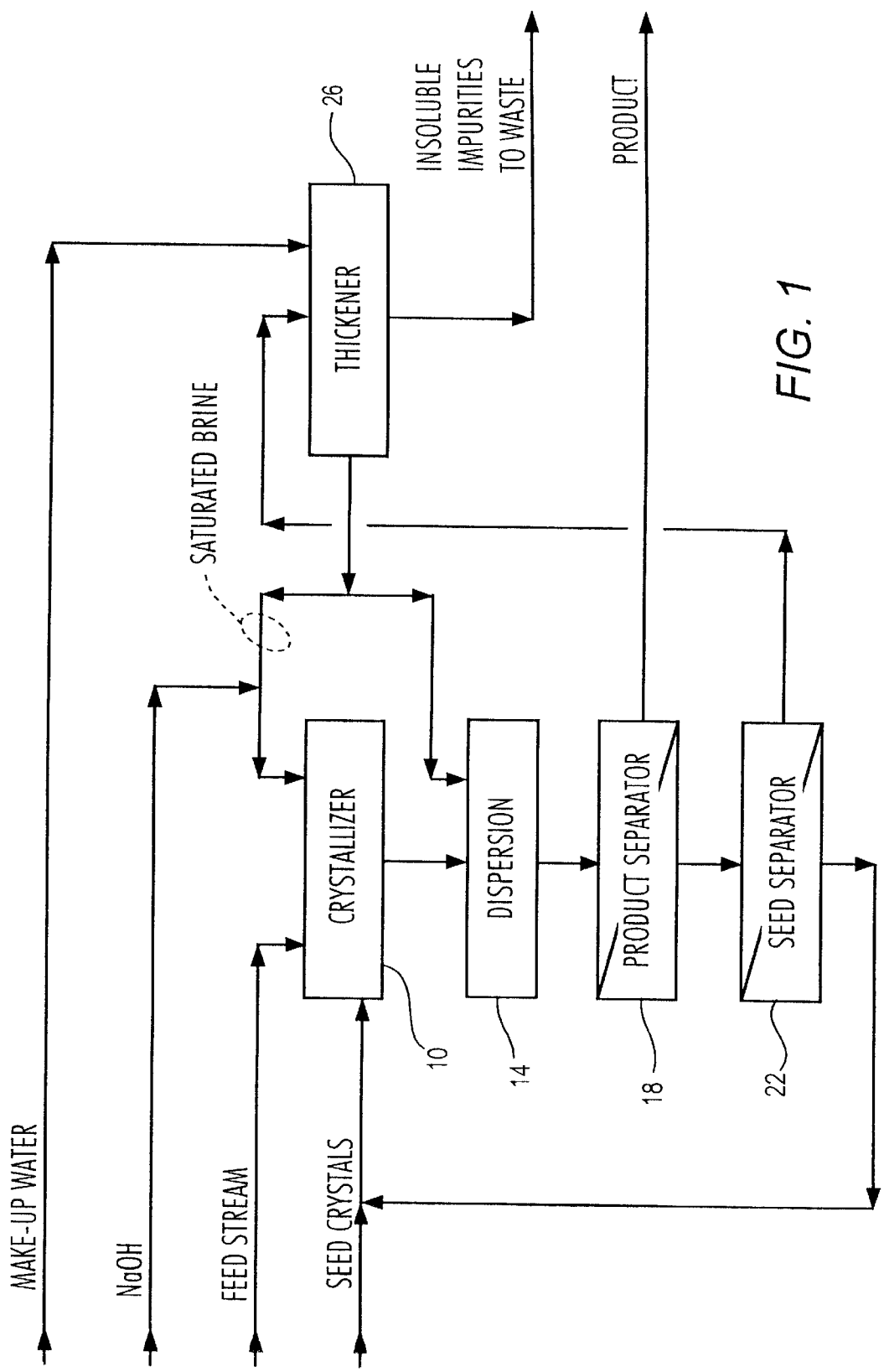
FIG. 1 is a schematic flow diagram of one embodiment of the process of the present invention.

DETAILED DESCRIPTION OF THE INVENTION 1.0 Introduction

The present invention is based in part on the discovery that under certain conditions some chemical compounds having multiple crystal forms (i.e., polymorphic compounds) have unexpectedly high dissolution rates and produce highly stable supersaturation capacity that can be rapidly relieved by the introduction of crystal surfaces of the polymorphic compound in a first crystal structure to produce relatively large crystals of the compound in a first crystal structure at high rates of crystal growth. Significant production efficiencies can be attained at high rates of crystal growth. The resulting crystals can be readily separated from insoluble impurities on a size separation basis. Relief of supersaturation is controlled such that crystal formation primarily occurs on existing crystals, rather than occurring as nucleation or growth of newly formed crystals. In this manner, the particle size distribution of crystals is controlled to achieve a desired distribution of product crystal size.

Processes of the present invention achieve supersaturation of the polymorphic compound by adding feed of the compound in the second crystal structure to a saturated solution under conditions in which crystals of the polymorphic compound in the first crystal structure are formed. Thus, the tendency of the feed to convert from the second crystal structure to the first crystal structure within the brine solution causes the feed in the second crystal structure to dissolve, thereby creating supersaturation, before forming the first crystal structure. Further, it has been found that some chemical compounds have a surprisingly high and stable supersaturation capacity. For example, under appropriate conditions, sodium carbonate has a supersaturation capacity of about 30 g/l, which is about an order of magnitude higher and more stable in the absence of sodium carbonate monohydrate crystal surfaces than would be expected by one skilled in the art. Therefore, the present invention includes achieving and maintaining high levels of supersaturation near the supersaturation capacity of the polymorphic compound to create a high driving force for supersaturation relief which results in rapid crystallization.

Supersaturation created in this manner is relieved by formation of the first crystal structure of the compound. The first crystal structure can form as a result of exceeding the supersaturation limit, which causes primary nucleation resulting in formation of clouds of small nuclei of the first crystal structure of the compound. The term "supersaturation limit" is used to describe a condition where the level of supersaturation of the compound in the brine solution is unstable and results in a relatively spontaneous formation of crystals by primary and/or secondary nucleation. This type of supersaturation relief is unproductive because the small nuclei cannot easily be grown to a size large enough to be separated from insoluble impurities. Supersaturation relief can also occur by growth of existing crystals of the compound in the first crystal structure, which is desired in the present invention.

Processes of the present invention are based on the recognition that since supersaturation is created by the introduction of feed in the second crystal structure, the supersaturation limit can be exceeded in a localized area at the point of introduction of the feed. Therefore, control of supersaturation and its relief in the local environment near where the feed is introduced is critical. The present invention provides the proper thermodynamic environment wherein it is easier to preferentially relieve supersaturation by growth of existing crystals than by nucleation.

Processes of the present invention include a multi-faceted approach to control local supersaturation and its relief to achieve the desired mechanism for supersaturation relief, preferably the growth of existing crystals. One of the elements of processes of the present invention is to use high agitation to rapidly disperse areas of local high supersaturation to avoid exceeding local supersaturation limits, and to bring the surfaces of existing crystals into contact with such areas of supersaturation. The use of high agitation is quite contrary to standard crystallization practice and technology.

Processes of the present invention also provide a large amount of available sites for relief of supersaturation on existing crystals so that if the degree of supersaturation in a localized area is approaching the maximum level, i.e., the supersaturation limit, the supersaturation can be quickly relieved by formation of the first crystal structure on an existing crystal surface instead of by nucleation. Sites for crystallization are provided by the use of seed crystals and/or by maintaining a high solids content in the crystallizer. The present invention can also include pausing during the introduction of feed to allow for dispersion of local areas of very high supersaturation by agitation and/or productive relief of supersaturation on existing crystals in local areas of very high supersaturation. Control of temperature in the crystallizer is also used to control the rate of relief of supersaturation.

The terms "recrystallization" and "crystallization" are used interchangeably herein and refer to the step of adding the polymorphic compound in the second crystal structure to a saturated brine solution and crystallizing the polymorphic compound in the first crystal structure from the saturated brine solution, i.e., the compound in the second crystal structure dissolves in the saturated brine solution, forms a supersaturated solution which then causes growth of crystals in the first crystal structure because the temperature and/or other condition of the saturated brine solution are in the range of stability for the first crystal structure. A "saturated brine solution" refers to a solution which is in equilibrium with the compound.

2.0 Feedstream Composition and Introduction 2.1 Composition

As noted above, a feedstream of the present invention comprises a polymorphic compound in a second crystal form which is to be converted to a desired first crystal form. For example, processes of the present invention can be used for purifying anhydrous sodium carbonate (such as calcined trona) containing impurities or for producing dense soda ash from light soda ash. Moreover, the present invention is particularly well adapted for use with feedstreams having high contents of insoluble impurities. In particular, the present invention can be used for purifying feedstreams in which impurities are included within the crystal structure even when the particles are finely ground. Thus, although the present invention can be used with a substantially pure feedstreams, the present invention is particularly suitable for use with feedstreams having greater than about 15% by weight insoluble impurities, and even more particularly, having greater than about 30% by weight insoluble impurities.

Polymorphic compounds of the present invention include compounds which have two or more crystal structures wherein the crystal structure of the compound is dependent on some operational variable in a crystallization process. For example, the different crystal structures can be different states of hydration and the operational variable can be temperature. Thus, in the instance of sodium carbonate, sodium carbonate occurs in a monohydrate crystal structure and in an anhydrous crystal structure. Among other variables, temperature will determine what state of hydration sodium carbonate is in.

Resources containing polymorphic compounds of the present invention are typically brine and evaporite chemicals. Such minerals can be found as bedded salts, playa deposits (dry lake beds) and solar evaporation ponds. Bedded salts are usually recovered by shaft mining or in situ solution mining. Playa deposits can be recovered by solution or open pit mining. Examples are Atacama caliche in Chile and brine chemicals recovered by solution mining at Searles Lake. Some examples of suitable polymorphic compounds, in addition to sodium carbonate, include kernite ($Na_2B_4O_4.4H_2O$) which is typically contaminated with gangue and some borax; calcined colemanite ($2CaO.3B_2O_3$); langbeinite ($2MgSO_4.K_2SO_4$); carnallite ($MgCl_2.KCl.6H_2O$) which typically includes NaCl (about 25%) and gangue (about 3–4%); mixed salts from solar ponds or shallow dry lakes such as Searles Lake ($KCl$-$K_2SO_4$-$Na_2SO_4$-$Na_2CO_3$) and the Great Salt Lake ($Na_2SO_4$-$K_2SO_4$); and Chile caliche ore ($NaCl$—$Na_2SO_4$) which typically includes a few percent of $NaCO_3$ with about 25% gangue.

2.2 Size

As noted, supersaturation is achieved by adding the compound in the second crystal structure to a saturated brine solution under temperature and/or other conditions at which the first crystal structure forms. Thus, the compound in the feedstream dissolves, thereby creating supersaturation and also releasing impurities, before forming the first crystal structure. The rate and completeness of the feedstream dissolving in a saturated brine solution is determined by, among other factors, its particle size. Since the presence of undissolved feedstream in the second crystal structure can compete with seed crystals of the compound in the first crystal structure as a substrate for relieving supersaturation, the feedstream added to the saturated brine solution should dissolve substantially completely to ensure that the majority of supersaturation relief is by growth of seed crystals, not by growth on undissolved feed, and to ensure that at least a portion of impurities present within the crystal lattice of the feedstream is released. If the feedstream dissolves only partially, the remaining particles can have undesired effects such as forming agglomerates or relieving supersaturation to form mixed particles of the compound in the first and second crystal structure. Thus, to ensure a substantially complete dissolution of the particles the particle size of in the feedstream, whether in a slurry form or a dry form, is preferably less than about 100 mesh (Tyler), more preferably less than about 150 mesh, still more preferably less than about 200 mesh, and most preferably less than about 400 mesh. It should be appreciated that when the particle size of the feedstream is within the above described range, any insoluble impurities present in the feedstream will also be within the confines of the above described particle size.

The above particle size limitations allow the polymorphic compound in the second crystal structure in the feedstream to dissolve relatively quickly and completely in a saturated brine solution in the crystallizer 10.

2.3 Feed Rate

As noted above, it has been surprisingly found that, under appropriate conditions, some chemical compounds have surprisingly high supersaturation capacities. For example, sodium carbonate has a supersaturation capacity of about 30 g/l, which is about an order of magnitude higher than would be expected by one skilled in the art. Therefore, the present invention includes achieving and maintaining high levels of supersaturation near the supersaturation capacity of the compound in question to create a high driving force for supersaturation relief which results in rapid crystallization. For example, the process includes creating supersaturation of at least about 5 g/l, more preferably at least about 10 g/l, more preferably at least about 20 g/l and up to 30 g/l. Supersaturation can be calculated within a localized volume in a crystallizer or within the entire volume of a crystallizer. For example, supersaturation can be calculated as follows. A volume of saturated brine, which can include the compound in the first and second crystal structures, can be withdrawn from a crystallization vessel through a screen and filter to remove solid materials. Water in the withdrawn brine is then evaporated and the amount of dissolved compound per volume of brine can be gravimetrically determined. The amount of compound in excess of the known solubility level is the amount of supersaturation. Because of the high capacity for supersaturation and the very rapid relief of supersaturation, the rate of introduction of the feedstream or feed rate can be very high in the present invention. More particularly, the feed rate can be at least about 100 grams per minute for each liter of volume (g/l/min), preferably at least about 200 g/l/min, more preferably at least about 400 g/l/min, and even more preferably at least about 800 g/l/min. These feed rates are significantly higher than feed rates expected to be useful by one skilled in the art and those utilized by previous crystallization methods.

2.4 Method of Introduction

The feedstream, which includes the polymorphic compound in the second crystal structure, can be introduced to the saturated brine solution using any of the known methods including by a direct injection, a screw feeder and gravity. The feedstream can be a slurry of the compound in the second crystal structure in a saturated brine solution or dry.

A dry feedstream must be dispersed and dissolved quickly in the saturated brine solution, otherwise particles may become hydrated and form agglomerates. If the particles in the feedstream are too coarse, they will not dissolve completely, thus possibly reducing the purity of the product; therefore, the particle size of the feedstream should be within the range discussed above. On the other hand, fine particles tend to "float" on top of the saturated brine solution and become hydrated and form agglomerates. Generally, at a high feedstream addition rate discussed above, it is difficult to quickly disperse and dissolve the compound in the second crystal structure into the saturated brine solution. It has been found by the present inventors that these problems can be overcome by using high agitation, as discussed below.

One can also avoid these problems, such as agglomerate formation and floatation of fines, by adding a feedstream in a slurry form. A slurry feedstream can be prepared by mixing the compound in the second crystal structure and the saturated brine solution at atmospheric pressure and transferring the mixture into a slurry feedstream vessel having a desired temperature and pressure to maintain the compound in the second crystal structure. Alternatively, the compound in the second structure and the saturated brine solution can be fed directly into the slurry feedstream vessel at a desired temperature and pressure to form a slurry feedstream.

Figure 2:
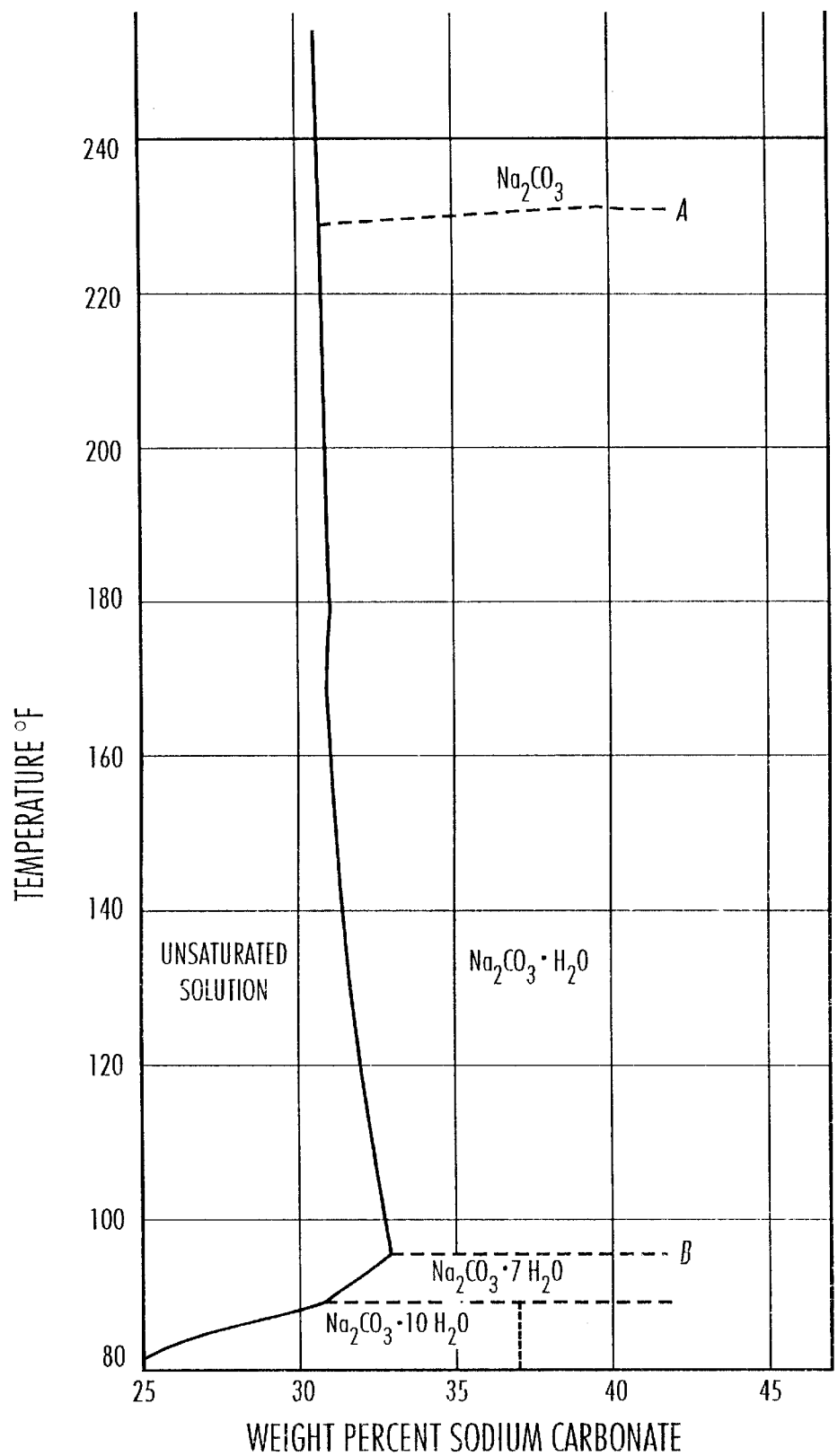
FIG. 2 is a phase diagram for sodium carbonate.

For example, at a temperature above the transition temperature of sodium carbonate monohydrate to anhydrous sodium carbonate (108.5° C. for a pure system of water and sodium carbonate at one atmosphere of pressure), solids in the slurry include anhydrous sodium carbonate crystals and insoluble materials originally present in the calcined trona ore. It is recognized by those skilled in the art that the transition temperature can be adjusted by various means, including by adding sodium chloride. One method of preparing a slurry of feedstream involves mixing anhydrous sodium carbonate with a saturated sodium carbonate brine solution at a temperature at least above the transition temperature of anhydrous sodium carbonate to sodium carbonate monohydrate preferably at least about 5° C. above the transition temperature, and more preferably at least about 2° C. above the transition temperature. A "transition temperature" refers to a temperature at which stable anhydrous sodium carbonate changes its morphology to stable sodium carbonate monohydrate. See for example, line A in FIG. 2, the transition of anhydrous to sodium carbonate monohydrate. Line B in FIG. 2 represents the transition temperature between sodium carbonate heptahydrate and sodium carbonate monohydrate. It will be appreciated that this step of producing a slurry feedstream must be conducted at above atmospheric pressures and must use a feeding mechanism that maintains a continuous pressure seal between the environment of the feed slurry and of the brine solution.

It should be further appreciated that this method of introduction of anhydrous sodium carbonate can be used for processing in any aqueous solution.

2.5 Calcination

When trona is used as a feedstream in a sodium carbonate system, it must be converted into anhydrous sodium carbonate by calcination prior to being added to the saturated brine solution. Trona can be calcined using any known calcination technology. For example, calcination can be conducted with a fluidized bed calciner. When a fluidized bed calciner is used to calcine trona ore, the trona ore is comminuted and is generally separated into three size ranges: 6×20 mesh, 20×100 mesh and −100 mesh. Each size can then be separately calcined in a fluidized bed calciner. Calcined trona is then combined and comminuted to provide a feedstream having above mentioned particle size. Further, trona in the feedstream can be calcined using indirect heat calcination as disclosed in commonly assigned U.S. patent application Ser. No. 09/151,694 that was filed on Sep. 11, 1998, which is incorporated herein by reference in its entirety.

3.0 Crystallization

As shown in FIG. 1, a feedstream is added to a saturated brine solution in a crystallizer to generate supersaturation within the saturated brine solution. The feedstream and the saturated brine solution can be added simultaneously and/or sequentially. The present method controls crystallization conditions so that relief of supersaturation created by introduction of the feed primarily occurs on existing crystals in the first crystal structure rather than by nucleation.

3.1 Seed Crystals

In one embodiment of the present invention, supersaturation relief on existing crystals is achieved by the introduction of seed crystals of the first crystal structure to the crystallizer 10. Thus, in contrast to other crystallization methods in which a major amount of crystal growth is by nucleation or on crystals newly formed by nucleation, processes of this particular embodiment of the present invention provide supersaturation relief primarily by growing seed crystals to crystals that are large enough to be separable from insoluble impurities on a size separation basis. Moreover, the size distribution of the product crystal population can also be controlled by adding seed crystals of a desired particle size range. By the use of seed crystals in this manner, crystal growth is productive in the sense that it occurs on crystals which will be large enough to recover on a size separation basis, rather than occurring on small particles which cannot practically be grown large enough to be separated from insoluble impurities.

Seed crystals can be prepared separately or can be prepared as a part of the process flow of the present crystallization process, as described below. For example, seed crystals can be produced by removing crystals from the crystallizer and sizing the crystals to produce a seed crystal size portion for reintroduction to the crystallizer. Furthermore, at least a portion of the product of the present process can be comminuted, e.g., ground, or partially dissolved, to a desired seed crystal size and used as a source of the seed crystals.

In a batch process, the seed crystals are typically added prior to the addition of the feedstream, whereas in a continuous process, the seed crystals are typically added continuously during the operation of the present invention. As used in this invention, a "continuous addition" can include both non-interrupted addition as well as interval addition throughout the process as needed.

The particle size of the seed crystals is selected such that a product having an acceptable particle size range is produced. For example, the seed crystals need to be large enough that, given the amount of growth achieved in a given crystallization, the resulting product crystals will be large enough to be separable from insoluble impurities on a size separation basis. Preferably, the particle size of the seed crystals is in the range from about 100 mesh (Tyler) to about 400 mesh, more preferably from about 100 mesh to about 200 mesh and most preferably from about 100 mesh to about 150 mesh. Alternatively, the range of the particle size of seed crystals is about 2 standard sieve sizes or less. A "standard sieve size" is denoted by increasing or decreasing the opening in a sieve size by the ratio of the square root of 2 or 1.414, i.e., taking a screen opening and multiplying or dividing it by the square root of 2 or 1.414. The seed crystal size range utilized is determined by the desired product particle size range. For example, a narrow seed crystal size range results in a narrow product particle size range.

The amount of seed crystals and feedstream added to the saturated brine solution depends on the volume of the saturated brine solution in the crystallizer 10. However, as noted below, the total amount of seed crystals and feedstream added to the saturated brine solution typically results in a slurry of the first crystal structure having a solids content in accordance with the parameters discussed below. As used herein, a "slurry of the first crystal structure" refers to a saturated brine solution containing solid crystals of the first crystal structure. Such a high solids content ensures that sufficient surface area is available for supersaturation relief on existing crystals before any significant amount of nucleation can occur in the brine solution. In another embodiment, for the above mentioned particle sizes of seed crystals and products, the ratio of seed crystals added to the feedstream added is at least about 1:1 by weight, preferably at least about 5:1 by weight, and more preferably at least about 10:1. Generally, about an equal amount of the solids content by weight of the seed crystals and the feedstream is added to the saturated brine solution.

3.2 Solids Content

A further aspect of the present invention to control supersaturation relief on existing crystals of the first crystal structure is to maintain a high solids content in the crystallizer 10. In this manner, if the degree of supersaturation in a localized area is approaching the maximum level, supersaturation can be quickly relieved by the first crystal structure formation on an existing crystal surface instead of by nucleation. As will be appreciated, the solids content in the crystallizer 10 depends on a variety of factors including the amount of seed crystals added and the amount and solids density of the feedstream added to the saturated brine solution, as well as the desired density for optimal crystallizer operation. These variables are controlled such that the slurry of the first crystal structure has a solids content of at least about 17% by weight, more preferably at least about 35% by weight, even more preferably at least about 40% by weight, and most preferably at least about 60% by weight. Alternatively, the particle surface area density, i.e., the total amount of surface area of crystals present per volume, is at least about 40 $cm^2$/ml, preferably at least about 75 $cm^2$/ml, more preferably at least about 95 $cm^2$/ml, and most preferably at least about 125 $cm^2$/ml.

3.3 Crystallizer Agitation

As noted above, the supersaturation limit of the brine solution can be exceeded in a small localized area because supersaturation is created by the feed dissolving to in the saturated brine solution. Therefore, control of supersaturation and its relief in the local environment, for example, by sufficiently high agitation, where the feed is introduced is critical. The term "local" refers to the immediate environment of a small portion of the brine solution in the crystallizer 10 and not the overall amount of compound within the total volume of the crystallizer 10. Thus, the term "local supersaturation limit" refers to the degree of supersaturation within any volume of a crystallizer in which formation of a crystal nucleus by primary and/or secondary nucleation can occur. It will be appreciated therefore, that within the crystallizer 10, while the average degree of supersaturation can be below the supersaturation limit, a localized region of high supersaturation can occur and thereby exceed the supersaturation limit in that localized region, resulting in undesired nucleation. To reduce or avoid this undesired nucleation, processes of the present invention can also include control of local supersaturation by using high agitation to rapidly disperse areas of high local supersaturation. High agitation brings the surfaces of existing crystals into contact with areas of high local supersaturation and thereby, increases the effective net surface area available for supersaturation relief by increasing the probability of an existing crystal particle coming into contact with an area of local high supersaturation area. One measure of agitation is a qualitative agitation index as described below. The term "agitation index" refers to a scale of agitation in a crystallizer. An agitation index of 0 means that there is no perceptible stirring or movement within the mixture, whereas an agitation index of 10 means the mixture in the crystallizer is stirred at a very high and rapid degree of mixing and agitation such that degradation or mechanical fracturing of crystals occurs. Table 1 shows the qualitative characteristics of the 0–10 agitation index.

TABLE 1

| Agitation Index | Description |
| --- | --- |
| 1 | static, no movement or mixing |
| 2 | |
| 3 | turnover of slurry, but not all solids held in suspension |
| 4 | |
| 5 | mild turnover of slurry with all solids held in suspension |
| 6 | |
| 7 | rolling surface with quick turnover and quick absorption of dry material into mass of slurry. |
| 8 | |
| 9 | violent turbulent movement of all slurry in entire vessel |
| 10 | degradation or mechanical fracturing of material |

Preferably, the mixture in the crystallizer 10 is stirred at an agitation index of at least about 4, more preferably at least about 7, still more preferably at least about 8, and most preferably at least about 9.

Evidence of insufficient agitation can be readily determined by examining crystal structures of the product. The product resulting from insufficient agitation may include the presence of agglomerates, long needle-like crystals or dendrites.

In contrast to other methods, agitation in the present invention preferably does not produce a typical vortex associated with using a single propeller non-baffled agitation system. In a particular embodiment of the present invention, agitation of the slurry of the first crystal structure is achieved by using at least two propellers having a counter pitch or other suitable agitation methods including using an attrition scrubber and any other impeller configurations which achieve the desired agitation index discussed above.

Preferably, the solution is agitated at greater than about 10 horsepower/1 000 gallons (hp/1000 gal), more preferably at least about 100 hp/1000 gal, and most preferably at least about 200 hp/1000 gal. Alternatively, when a propeller system is used for agitating the slurry of the first crystal structure, the propeller tip speed is at least about 8 feet/sec (ft/sec), preferably at least about 10 ft/sec, and more preferably at least about 22 ft/sec.

Adequate agitation can be achieved by use of any vessel providing agitation as described above. For example, such a vessel can include a one impeller system; two impellers having counter pitch, such as is used in an attrition scrubber; multiple impellers having alternating counter pitch in the crystallizer 10, or other configurations providing the desired agitation index. Thus, in such agitation, it is important to create a rapid exchange of solid particles and the solution portion of the saturated brine solution.

It should be noted, however, that while high agitation is beneficial, it should be conducted in a manner without a significant amount of impact destruction. The term "impact destruction" refers to a process where two or more particles collide and result in a particle size reduction for one or more particles.

3.4 Temperature Control

As discussed above, the temperature of the saturated brine solution is maintained such that the formation of the first crystal structure is formed. For example, formation of sodium carbonate monohydrate is favored as determined by the phase diagram, as shown in FIG. 2. In this example, the temperature of the saturated brine solution in the crystallizer 10 is maintained at between about 40° C. and the transition temperature of anhydrous sodium carbonate to sodium carbonate monohydrate to ensure formation of sodium carbonate monohydrate, preferably between about 70° C. and the transition temperature of anhydrous sodium carbonate to sodium carbonate monohydrate, more preferably between about 90° C. and the transition temperature of anhydrous sodium carbonate to sodium carbonate monohydrate, and most preferably between about 98° C. and the transition temperature of anhydrous sodium carbonate to sodium carbonate monohydrate.

It has been discovered by the present inventors that keeping the temperature in the crystallizer as close as possible to but below the transition temperature between first and second crystal structures reduces the "drive", i e., the rate of conversion, of the feedstream to change morphologically to the first crystal structure. This discovery allows the processes of the present invention to be controlled easily and results in larger, better formed crystals as discussed in detail below.

It should be noted that temperature of the saturated brine solution is preferably actively controlled to maintain a fairly constant temperature. For example, if the crystallization reaction is exothermic, the crystallizer will need to be cooled to avoid overheating. In addition, temperature differences between the saturated brine solution and the feedstream can cause fluctuations in temperature unless the crystallizer is cooled or heated to maintain a constant temperature. Alternatively, temperature differences between the saturated brine solution and the feedstream can be kept small enough such that no significant cooling or heating of the saturated brine solution occurs during the addition of the feedstream. In this instance, preferably, the temperature difference between the feedstream and the saturated brine solution is about 20° C. or less, more preferably about 15° C. or less, and most preferably about 10° C. or less.

In another embodiment, the temperature of the dry feed particles in the feedstream is at least about 95° C., preferably at least about 120° C., and more preferably at least about 150° C.

In the embodiment of sodium carbonate, freshly calcined trona can be added directly to the crystallizer 10 along with a saturated brine solution to maintain the temperature of the mixture in the crystallizer 10 as disclosed above. Freshly calcined trona has a high particle temperature as it comes out of the calciner. By adding a freshly calcined, i.e., hot, trona to the saturated brine solution, the amount of energy and the cost required to maintain the mixture at the above described temperature can be significantly reduced compared to processes where calcined trona is reheated prior to being added to the saturated brine solution or where the saturated brine solution is at a higher temperature then the feedstream.

As noted above, the present invention includes controlling supersaturation relief to achieve crystal growth on existing crystals rather than initiating nucleation. A further aspect of the present invention is the control of supersaturation relief by modifying the temperature of the crystallization solution in a temperature cycling process to control the amount of fines as discussed in more detail below.

3.5 Feed Addition Pause

Crystal formation in the form of nucleation occurs when the local supersaturation level exceeds the supersaturation limit. When the rate of supersaturation generation exceeds the rate of supersaturation relief, eventually the supersaturation level somewhere in the crystallizer will exceed the supersaturation limit resulting in nucleation (sometimes referred to as "snowing-out"). Thus, to prevent the supersaturation level in a local area from exceeding the supersaturation limit, the addition of the feedstream to the saturated brine can be stopped briefly or intermittently to decrease the supersaturation level by allowing growth of existing crystals. In addition, such a feed addition pause allows any very fine material, which has been unintentionally formed and which would be the thermodynamically unstable, to dissolve. In this manner, such fine material is not available as a site for relief of supersaturation. More particularly, the break or pause in feedstream addition can be conducted at least about 60% of the time of crystallization. More preferably, the pause can be conducted at least about 30%, and most preferably, at least about 5% of the time of crystallization. For example, if the pause is 10% of the crystallization time, the feedstream would be paused 6 minutes during every hour of operation. It should be noted that when pausing is used, it is preferably conducted frequently, such as by switching between feeding and pausing every several minutes, or about every five minutes.

3.6 Crystal Growth Rate

It is believed that the conventional recommended crystal growth rates for good crystal quality is from about 2 microns/minute to about 5 microns/minute. With regard to sodium cabonate monohydrates, a "good crystal quality" refers to crystals which are generally roughly equidimensional, slightly elongated with an aspect ratio of W×L×H of about 1:1.5:0.75. See for example, Goldschmidt, Atlas der Krystallformen, p. 128 (Carl Winters Universitätbuchhandlung, Heidelberg 1922), which is incorporated herein by reference in its entirety. The crystal growth rate of the present invention is significantly higher than the conventional recommended crystal growth rates while providing a similar crystal quality. Preferably the crystal growth rate of the present invention is at least about 5 microns/minute, more preferably at least about 10 microns/minute, and most preferably at least about 20 microns/minute. It has been found that the crystal growth rate of the present invention does not decrease significantly by having a higher solids to saturated brine solution ratio. However, it is believed the crystal growth rate does depend on the size of the seed crystals. The reason for the higher growth rate of coarser crystals is the mass transfer of crystals in the first crystal structure from finer crystals to coarser crystals. The operation of this mechanism at high crystal growth rates such as in the current invention is contrary to what would be expected by one of skill in the art.

An average crystal growth rate can be determined by a variety of methods including by a statistical analysis of a sample product crystal. For example, the average crystal growth rate can be obtained by dividing the total amount of crystal growth in the sample by the total crystallization time and the total crystal surface area.

3.7 Nucleation Control

Processes of the present invention involve controlling crystallization conditions as discussed in Sections 3.1–3.6 to provide conditions for relieving the supersaturation in the crystallizer 10 by growing existing crystals rather than by nucleation. If a significant amount of primary and/or secondary crystal nucleation occurs in the crystallizer 10, then a large amount of fines is generated. Production of fines limits productive crystal growth because fines have a large ratio of surface area to volume compared to larger crystals. Since fines are small, even significant growth of them will not make them large enough to be separated from insoluble impurities on a size separation basis. Therefore, such growth is unproductive. However, it should be appreciated that some formation of new crystals by nucleation may be necessary when the process includes generating new seed crystals. Thus, processes of the present invention may be used to allow formation of new crystals by nucleation in a relatively controlled amount for this purpose.

Thus, in a further aspect of the present invention, the amount of solids in the saturated brine formed by primary and/or secondary nucleation in the crystallizer 10 is maintained at about 10% by weight or less of the total solids of the compound in the saturated brine, more preferably at about 5% by weight or less of the total solids of the compound in the saturated brine, still more preferably at about 1% by weight or less of the total solids of the compound in the saturated brine, and most preferably at about 0.5% by weight or less of the total solids of the compound in the saturated brine. For example, given a defined crystal population at a point in time, one can determine whether new crystals have been formed by primary and/or secondary nucleation by determining whether the crystal population at a later point in time has smaller crystals or an increase in smaller crystals compared to the earlier point in time. One can also determine whether new crystals have been formed by primary and/or secondary nucleation by identifying whether a drop in yield of +100 mesh crystals occurs. One can also determine whether new crystals have been formed by primary and/or secondary nucleation in a continuous process by identifying fluctuations in the size distribution of crystals at a point in time at which a stable population would be expected.

In a further aspect of the invention, control of the crystallization conditions can maintain or reduce the portion of the solid material in the slurry of the first crystal structure which has a small particle size. More particularly, the processes of the present invention can include maintaining the amount of solids in the slurry having a particle size of less than about 400 mesh at less than about 10% by weight of the total solids of the compound in the slurry, more preferably at less than about 2% by weight of the total solids of the compound in the slurry, and most preferably at less than about 0.5% by weight of the total solids of the compound in the slurry.

3.8 Agglomerate/Aggregate Control

Processes of the present invention for controlling crystallization conditions as discussed above in Sections 3.1–3.6 can also substantially avoid formation of a significant amount of agglomerates and/or aggregates. If a significant amount of agglomerates and/or aggregates are formed, the purity of any recovered product may be significantly decreased because insoluble and soluble impurities can be trapped within the agglomerates and aggregates. Thus, in one aspect of the present invention, the crystallization process is conducted by maintaining the amount of solids in the slurry in the form of agglomerates and/or aggregates at about 10% by weight or less of the total solids of the compound in the slurry, more preferably at about 5% by weight or less of the total solids of the compound in the slurry, and most preferably at about 0.5% by weight or less of the total solids of the compound in the slurry.

As used herein, the term "aggregate" refers to a collection of particles or crystals in clusters or clumps. The particles can be held together as a result of the attraction of weak forces, such as van der Waals forces. The term "agglomerate" refers to particles or feed held together by forces stronger than van der Waals forces, which can be formed, for example, by feed particles which are not fully dissolved acting as a site for crystallization of crystals of the first crystal structure, or feed that was not dispersed or dissolved absorbing water to hydrate.

3.9 Crystallizer Pressure

The crystallizer 10 can be equipped to be operated at a wide range of pressure. In one embodiment, the crystallizer 10 is operated at atmospheric pressure. In another embodiment, the crystallizer 10 can be operated at any desired pressure of up to about 35 pounds per square inch (psia), more preferably up to about 30 psia, and most preferably up to about 25 psia. Unless otherwise noted, the pressure refers to an absolute pressure and not a relative, i.e., gauge, pressure. Whether operated under atmospheric pressure or higher pressure, the temperature of the saturated brine solution in the crystallizer 10 is maintained to favor the formation of the first crystal structure of the compound. When the crystallizer 10 is operated under pressure, the introduction of the feedstream is preferably at a similar pressure. A pressurized pump such as a Fuller Kinyon pump (not shown) or any other type of pump which can achieve a desired pressure can be used to introduce the dry or slurry feedstream into the crystallizer 10. However, it should be recognized that the feedstream can be at a variety of pressures independent of the crystallization itself.

3.10 Multiple Crystallization Vessels

In a further embodiment, the crystallization is conducted in a series of two or more crystallizers. In this manner, the initial feedstream can be used to generate fines by nucleation in a first crystallizer. The fines are then transferred to a second crystallizer and used as seed crystals for subsequent crystallization where they are grown to a larger size. Thus, in either the second or some subsequent crystallizer, the crystals are grown large enough for a size separation from insoluble impurities. By using a multiple tank system which allows successive crystal growth conditions, the need for a separate seed crystals as discussed above in Section 3.1 can be eliminated.

4.0 Dispersion

Referring again to FIG. 1, at least a portion of crystals of the first crystal structure and saturated brine solution are separated from the crystallizer 10. The product is eventually recovered in a product separator 18, preferably on a size separation basis. However, as noted above, crystallizations are conducted at high solids content, such as at least about 17% solids content. Product separation with such a viscous mixture can be difficult. Therefore, as shown in FIG. 1, the separation process can also include transferring at least a portion of the slurry of the first crystal structure from the crystallizer 10 to a dispersion tank 14 to decrease the solids content of the slurry in order to, inter alia, facilitate the separation process. It should be noted that the dispersion step should not dilute the solution below saturation. Otherwise, product loss can occur by dissolution of product. Typically, a saturated brine solution having a substantially negligible solids content is added to the dispersion tank 14 to reduce the solids content of the monohydrate slurry to about 25% by weight or less, more preferably to about 15% by weight or less solids content, and most preferably to about 10% by weight or less solids content.

5.0 Recovery

The present invention also includes recovering product from the slurry of the first crystal structure. The recovery process can include separating a particular particle size range of crystals of the first crystal structure from the slurry. Size separation is conducted in a separation apparatus 18 and can be affected by any of the appropriate known methods. For example, screening, cyclones (such as hydrocyclones) or elutriation can be used.

The crystal product which is recovered typically has a particle size of greater than at least about 150 mesh. Preferably, the product has a particle size of greater than at least about 100 mesh, and more preferably greater than at least about 80 mesh. More particularly, the size cutoff for product recovery has to be larger than the particle size of the feed so that insoluble impurities initially in the feed are not recovered with product.

Separation of crystals of the first crystal structure is generally conducted by screening or cycloning and avoiding drying of the crystals. Drying of the crystals at this stage may result in cementing, or agglomerate formation, of crystals and/or impurities, thereby reducing the purity of the product (but not the purity of the crystals). Drying of the crystals can be avoided or reduced by reducing or eliminating evaporation of the solvent, or by covering the screen with solvent or solvent vapors to maintain solvent saturation. Alternatively, a pressurized and/or submerged size separation process can be used, which ensures that local evaporation of solvent is minimized or eliminated.

Once crystals are separated from the saturated brine solution, they can be dehydrated (i.e., dried) using known techniques, if desired.

The purity of crystals produced by the processes of the present invention is at least about 99%, more preferably at least about 99.5% and most preferably at least about 99.8%. The term "purity of product" refers to the overall purity of the product and can include impurities which can be present on the surface of the crystals or which can be trapped within agglomerates. The term "purity of crystals" refers to the presence or lack of impurities within the crystal lattice structure. In other words, the purity of product refers to the purity of a particular batch of the product produced by the process of the present invention, whereas the purity of crystals refers to the purity of crystals within the product.

5.1 Physical Property of the Product

Unlike some of the current crystallization processes, the process of the present invention does not utilize a crystal modifier to affect the crystal shape of the product. In the instance of sodium carbonate, the majority of the product is block-like in shape, as discussed above, and is surprisingly resistant to abrasion. Preferably at least about 55% of the particles in the product is block-like in shape, more preferably at least about 75%, and most preferably at least about 95%. It is believed that these block-like crystals are responsible for a high bulk density observed in the product of the present invention. The product of the present invention has a poured bulk density of at least about 0.95 g/ml, preferably at least about 1.0 g/ml, and more preferably at least about 1.1 g/ml. In another embodiment of the present invention, the product has a packed density of at least about 1.0 g/ml, preferably at least about 1.1 g/ml, and more preferably at least about 1.2 g/ml.

The product of the present invention also has a lower amount of dust, i.e., fines, than crystals produced by the conventional crystallization processes. Without being bound by any theory, this low amount of dust present in the product is believed to be due to a variety of novel features of the present invention including the use of seed crystals, the relief of supersaturation primarily by crystal growth rather than by formation of new crystals, and the block-like shape of the product crystals which is more resistance to abrasion than other crystal shapes.

The product of the present invention has improved flowability and decreased bridging compared to products produced by conventional methods. It is believed the block-like crystal shape and the absence of fine crystals produces higher flowability and lower bridging in storage vessels. This block-like crystal shape has smoother crystal surfaces compared to other crystal shapes such as dendritic or needle like crystal shapes. Without being bound by any theory, it is believed that the smooth surface of block-like shaped crystals has a lower frictional force than other crystal shapes. In addition, larger particles have a reduction in specific surface area, and thereby the cohesiveness between particles is reduced.

6.0 Seed Separation

Again referring to FIG. 1, an undersize fraction of the slurry of the first crystal structure from the product separator 18 can be transferred to a seed crystal separation apparatus 22 to separate at least a portion of crystals from the undersize fraction for use as seed crystals. The undersize fraction will include crystals smaller than the size cutoff in the product separator 18 and insoluble impurities. To effectively produce a seed crystal population, the undersize fraction from the product separator 18 must include an upper size range which is larger than the size of the insoluble impurities. In this manner, by conducting a size separation in the seed separator 22, seed crystals which are free of insoluble impurities can be recovered as an oversize fraction, and the insoluble impurities with small crystals are generated as the undersize fraction. The seed crystal separation can be accomplished by any of the appropriate known methods as discussed above. As discussed above, a seed crystal population produced in this manner is then used in a crystallizer.

Alternatively, the fines can be further sized at an intermediate size to remove the insoluble particles and crystals of the first phase which are too small for productive growth.

Other methods of producing seed crystals include the following: wet comminution of crystals of the first crystal structure; dry comminution of crystals; dissolution of a portion of crystals of the first crystal structure by water addition; and dissolution of crystals in a slurry by changing the slurry temperature to increase the solubility of the compound in the brine.

7.0 Thickening

The undersize fraction from the seed separator 22, containing saturated brine solution, insoluble impurities and/or crystals of the first crystal structure which are smaller than the desired seed crystal size is then further processed. As shown in FIG. 1, the undersized fraction from the seed separator 22 is transferred to a thickener 26 to allow for settling of insoluble impurities. The settled insoluble impurities are then purged from the system, while the clear overflow and/or the resulting clarified saturated brine solution can be recycled and reused. It should be appreciated that during the settling process, the brine solution can be diluted with water or a non-saturated brine solution to dissolve fine crystals which may be present. Furthermore, makeup water can be added as required by the overall mass balance of the system.

Prior to being purged from the system, settled insoluble impurities can be further concentrated, e.g., by filter press, to recover at least a portion of the saturated brine solution. In addition, the clear overflow and/or the clarified saturated brine solution can be further clarified by filtration to remove any fine insoluble impurities that may be present.

When the saturated brine solution is reused, it is desirable that the temperature of the saturated brine solution in the thickener is kept at no more than about 20° C. different than the temperature of the saturated brine solution in the crystallizer tank to minimize the energy cost of reheating the saturated brine solution from the thickener. Preferably, the difference in temperature between the saturated brine solution and the saturated brine solution in the crystallizer tank is about 15° C. or less, more preferably about 10° C. or less, and most preferably about 5° C. or less. In the event of a chemical compound in which the crystallization reaction is highly exothermic, there is not a need to be concerned about the temperature of the brine solution in the thickener.

8.0 Bicarbonate Control

When the compound is sodium carbonate, it has been found that the crystal size and/or the shape can be affected by the presence of sodium bicarbonate in the saturated brine solution. Therefore, the process of the present invention can further include maintaining the concentration of sodium bicarbonate below about 10 g/l in the saturated brine solution which is added to the crystallizer 10, more preferably below about 5 g/l, and most preferably about 0 g/l. Larger sodium carbonate crystals can be grown in crystallization processes when the amount of bicarbonate present in the brine solution is maintained within these limits. One method of controlling the sodium bicarbonate level in the saturated brine solution is disclosed in a commonly assigned, U.S. patent application Ser. No. 09/167,627, filed on Oct. 6, 1998, which is incorporated by reference herein in its entirety.

A further advantage of the present process which has been recognized is that, in the absence of bicarbonate, crystals which are grown have a more beneficial shape, e.g., a well-formed block-like shape. In contrast, crystals grown in the presence of significant amounts of sodium bicarbonate can have a needle-like, dendritic or jack-shaped structure and/or cloudy centers. Thus, crystals produced in accordance with the present invention, having a more compact and block-like shape, produce a material having a higher bulk density and a lower friability than those produced in the presence of a relatively large amount of bicarbonate.

In a preferred embodiment of the present invention, a sufficient amount of base is used to reduce the concentration of sodium bicarbonate to within the parameters discussed above. Preferably, after neutralizing any initial sodium bicarbonate in the crystallizer, base is added to the crystallization process to maintain a concentration of at least about 0.75 mole/l of equivalent base, more preferably at least about 0.50 mole/l, and most preferably at least about 0.25 mole/l. When sodium hydroxide is used as the base, after neutralizing any initial sodium bicarbonate in the crystallizer, the amount of sodium hydroxide used is preferably at least about 6 g/l, more preferably at least about 4 g/l, and most preferably at least about 2 g/l.

9.0 Aging

Processes of the present invention can also include transferring at least a portion of the slur of the first crystal structure from the crystallizer 10 and/or at least a portion of the screened saturated brine solution into an aging apparatus (not shown). The aging apparatus allows growth of at least a portion of the crystals in the saturated brine solution by dissolving at least a portion of fines and then promoting crystal growth by relieving the supersaturation in the form of a crystal growth, i.e., some mass of fine particles is converted to coarse particles by a process of dissolving and recrystallizing. This phenomenon occurs because extremely small particles appear to be less thermodynamically stable than larger particles.

As used in this invention, "aging" refers to a process of allowing time for dissolution of some of the small fine crystals present in the saturated brine solution and relieving at least a portion of the supersaturation by growth on existing crystals. The aging can be a natural equilibrium phenomena where crystals are constantly being dissolved and recrystallized or it can be achieved by diluting and concentrating the saturated brine solution or simply by a temperature cycling process. The aging process can be used to produce seed crystals or to increase the amount and/or the size of the product. For example, in the instance of sodium carbonate, when the temperature of the saturated brine solution in the crystallizer 10 is from about 80° C. to about 90° C., it has been observed that by allowing the resulting saturated brine solution to stir or stand for an additional about 10 to about 15 minutes after the addition of the feedstream and/or the seed crystals, the amount and/or the size of larger sodium carbonate monohydrate crystals can be significantly increased. This phenomena occurs at faster rates at increased temperatures.

The temperature cycling process involves changing the temperature of the saturated brine solution at least about 10° C., more preferably at least about 20° C., and most preferably at least about 40° C. to increase solubility. Alternatively, in the instance of sodium carbonate, the temperature of the saturated brine solution is reduced to less than about 70° C., more preferably less than about 60° C., and most preferably less than about 50° C., but always above 35° C., the transition point between sodium carbonate decahydrate and monohydrate. As FIG. 2 shows, the solubility of sodium carbonate increases as the temperature is reduced. Thus, reducing the temperature of the saturated brine solution dissolves at least a portion of the sodium carbonate monohydrate crystals. It should be appreciated that while some fines may be completely dissolved, some larger crystals may also be partially dissolved during the temperature cycling process. Thus, in one embodiment, the fines are classified into coarse fines and small fines. The cutoff for the coarse fines would be a size that would not dissolve completely in the temperature cycle. Then, the small fines fraction is cooled to achieve complete dissolution of the small fines. The fractions are then rejoined. When the temperature of the saturated brine solution is increased, the solubility of sodium carbonate decreases as shown in FIG. 2. This reduction in solubility causes relief of supersaturation of the brine solution by growth of existing crystals or by primary and/or secondary nucleation. By maintaining a condition which limits the amount of primary and/or secondary nucleation as discussed above, the amount of fines generated can be reduced and the crystal sizes can be increased using an aging process.

As stated above, temperature cycling process can be applied to the entire slurry of the first crystal structure in the crystallizer or to a slip stream, i.e., a portion, of the slurry such that a portion of the slurry is cycled through an external heat exchanger to change the temperature of the slurry.

When the temperature cycling is applied to the entire slurry as a whole, the process is typically performed by cycling the crystallizer's temperature about once an hour. If the temperature cycling is affected to a portion of the slurry through an external heat exchanger, such temperature cycling is conducted on a continuous basis while a portion of the slurry is continuously circulated through the heat exchanger. In one particular embodiment of a temperature cycling process, a heat exchanger is used for the temperature cycling process. In this embodiment, the temperature of the slurry is typically changed by at least about 5° C., more preferably at least about 10° C., and most preferably at least about 20° C.

10.0 Fines Scavenging

As a means for improving the product yield, the slurry of fine particles remaining after the product size crystals have been removed can be further processed to recover the mineral values present in the slurry of fines. The slurry of fines can also include impurities which were present in the feedstream and any fine crystals of the first crystal structure which are smaller than the product size. One technique for processing the slurry of fines to improve the product yield is to use a pressure slurry system as described below.

10.1 Pressure Slurry System Crystallization

This process will be described in terms of a sodium carbonate system. In this process, the slurry of fines is thickened to a relatively high solids content, preferably to at least about 17% solids by weight, more preferably to at least about 25% solids by weight, even more preferably to at least about 40% solids by weight, and most preferably to at least about 60% solids by weight. The slurry of fines can be thickened by a conventional gravity thickener, a membrane filter, or any suitable device that permits decanting saturated brine from the slurry of fines while retaining the solids.

The thickened slurry of fines is then pumped into a pressure vessel operating above the transition temperature of monohydrate sodium carbonate to anhydrous sodium carbonate. In general, this vessel is operated at a temperature of at least about 7° C. above the transition temperature. In the pressure vessel, the incoming slurry is heated above the transition temperature of monohydrate sodium carbonate to anhydrous sodium carbonate. This heating converts sodium carbonate monohydrate to anhydrous sodium carbonate. The resulting anhydrous sodium carbonate slurry is then added to the feedstream or to the crystallizer directly. In this manner, the slurry of sodium carbonate monohydrate fines is recycled to the crystallization process of the present invention to increase the amount of sodium carbonate recovery.

Depending on the yield of each stage of crystallization, a pressure slurry system for fines scavenging can be repeatedly used. Because the operating and capital costs in each stage of crystallization processes of the present invention are relatively low, having a multiple stage pressure crystallization process can be readily justified economically. The use of a multiple stage crystallization process increases the yield of sodium carbonate from a depletable resource such as trona.

11.0 Product Purity Control

Although processes of the present invention provide product crystals of a purity level as described above, in some cases, such as when soluble impurities are present in the feedstream, it may be necessary to utilize a multiple stage crystallization process to achieve the product having the above described purity level.

Crystals are produced in a first stage of crystallization. These crystals are mechanically separated from the brine and repulped in brine from a second stage of crystallization in the process. This repulped slurry is fed to the second stage pressure slurry crystallization system as described above. The recrystallization that takes place in this second stage will produce crystals containing less soluble impurities than were present in the product of the first stage recrystallization. This process can be repeated with as many stages as are required to get the desired purity levels.

The following example is provided for purposes of illustration and is not intended to limit the scope of the present invention.

EXAMPLE 1

This example illustrates the high capacity for supersaturation of sodium carbonate and a technique for measuring the same.

A four liter vessel with intense agitation was partially filled with a slurry of 65×100 mesh sodium carbonate monohydrate seed crystals and heated to 88° C. Minus 150 mesh calcined trona, heated to 125° C. was added rapidly to the vessel. Immediately after addition of the calcined trona was complete, the concentration of dissolved sodium carbonate in the brine was determined by withdrawing the brine through a screen and filter to exclude seed crystals and calcined trona. Water was evaporated from the withdrawn brine to produce a solid residue. The quantity of sodium carbonate per gram of withdrawn brine was gravimetrically determined. The quantity of sodium carbonate in excess of the solubility limit of sodium carbonate is the amount of supersaturation. A second sample was taken 5 minutes after feed addition was complete to evaluate the amount of supersaturation at that time and the amount of relief of supersaturation in the 5 minute interval.

Three tests were run with the amount of feed being varied. The amount of feed added, the time of addition, the percent solids, and the amount of supersaturation at 0 minutes and at 5 minutes are shown below in Table 2.

TABLE 2

| Test # | Feed (g/l) | Time to Add Feed (seconds) | % Solids at End | Grams/liter Supersaturation 0 min. | 5 min. |
|---|---|---|---|---|---|
| 1 | 30 | 10 | 12.2 | 15.8 | 7.1 |
| 2 | 60 | 10 | 15.7 | 22.5 | 5.9 |
| 3 | 120 | 15 | 25.5 | 26.3 | 1.5 |

The results in Table 2 illustrate that high levels of supersaturation can be obtained by practice of the present invention. For example, in Test No. 3, supersaturation of 26.3 g/l was present at the end of the feed addition. The results further illustrate that the supersaturation is rapidly relieved. For example, in Test No. 3, the amount of supersaturation at the end of feed addition went from 26.3 g/l to 1.5 g/l at 5 minutes after the end of feed addition.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A crystallization process for producing a first crystal structure form of a polymorphic compound from a feedstream comprising a second crystal structure form of the compound comprising:

(a) adding the feedstream to a saturated solution of the compound to create supersaturation of at least about 5 g/l;

(b) preferentially relieving supersaturation by growth of crystals over nucleation, wherein the crystals are the first crystal structure form of the compound; and (c) recovering crystals from the saturated solution.

2. The crystallization process of claim 1, wherein said polymorphic compound is selected from the group consisting of sodium carbonate, kernite, colemanite, langbeinite, anhydrite, carnallite, $KCl-K_2SO_4-Na_2SO_4-Na_2CO_3$ mixed salts, $Na_2SO_4-K_2$ mixed salts, and Chile caliche ore.

3. The crystallization process of claim 1, wherein the first crystal structure is a hydrated form of the polymorphic compound.

4. The crystallization process of claim 1, wherein the second crystal structure is an a lower hydrated form of the polymorphic compound.

5. The crystallization process of claim 1, wherein whether the compound takes the form of the first crystal structure or the second crystal structure is temperature dependent.

6. The crystallization process of claim 1, wherein the process further comprises introducing seed crystals in the first crystal structure form of the compound to the supersaturated solution.

7. The crystallization process of claim 1, wherein the step of relieving supersaturation comprises relief of supersaturation on seed crystals of the compound in the first crystal structure form.

8. The crystallization process of claim 7, further comprising sizing the recovered crystals to produce a seed crystal size fraction.

9. The crystallization process of claim 7, wherein a particle size of the feedstream is less than a particle size of the seed crystals.

10. The crystallization process of claim 7, wherein the range of a particle size of the seed crystals is about 3 standard sieve sizes or less.

11. The crystallization process of claim 7, wherein a particle size of the seed crystals is from about 100 mesh to about 150 mesh.

12. The crystallization process of claim 1, wherein a particle size of the feedstream is about 150 mesh or less.

13. The crystallization process of claim 1, wherein the step of relieving the supersaturation preferentially by growth of the compound in the first crystal form over nucleation comprises maintaining a solids content of at least about 17%.

14. The crystallization process of claim 1, wherein the step of relieving the supersaturation preferentially by growth of the compound in the first crystal form over nucleation comprises agitating the solution at an agitation index of at least about 4.

15. The crystallization process of claim 1, wherein the step of relieving the supersaturation preferentially by growth of the compound in the first crystal form over nucleation comprises periodically changing the temperature of the solution by at least about 5° C.

16. The crystallization process of claim 1, wherein the step of relieving the supersaturation preferentially by growth of the compound in the first crystal form over nucleation comprises pausing feedstream addition at least about 5% of the time of crystallization.

17. The crystallization process of claim 1, wherein an amount of solids in the solution formed by nucleation is maintained at about 5% by weight or less of the total solids of the compound in the solution.

18. The crystallization process of claim 1, wherein an amount of solids in the solution having a particle size of less than about 400 mesh is maintained at about 10% by weight or less of the total solids of the compound in the solution.

19. The crystallization process of claim 1, wherein an amount of solids in the solution in the form of agglomerates and/or aggregates is maintained at about 10% by weight or less of the total solids of the compound in the solution.

20. The crystallization process of claim 1, wherein the feedstream further comprises insoluble impurities.

21. The crystallization process of claim 20, wherein the step of recovering comprises:
   removing a portion of the first crystal structure form of the compound from the solution;
   dispersing the first crystal structure form of the compound in a second solution; and
   separating the first crystal structure form of the compound from insoluble impurities on a size separation basis.

22. The crystallization process of claim 1, wherein the rate of adding the feedstream is at least about 100 g/L/min.

23. A process for producing a first crystal structure form of a polymorphic compound from a feedstream comprising a second crystal structure form of the compound and impurities, the process comprising:
   (a) adding the feedstream to a saturated solution of the compound at a rate of at least about 100 g/l/min to create supersaturation of at least about 5 g/l;
   (b) preferentially relieving the supersaturation by growth of crystals in the first crystal structure over nucleation, wherein the step of relieving comprises adding seed crystals of the compound in the first crystal structure to the saturated solution, maintaining a solids content of at least about 17% and agitating the solution at an agitation index of at least about 4; and
   (c) recovering a portion of the crystals in the first crystal structure from the saturated solution, wherein said recovering step comprises removing a portion of the crystals in the first crystal structure from the solution, dispersing the crystals in the first crystal structure by the addition of saturated solution and separating crystals in the first crystal structure from insoluble impurities on a size separation basis.

24. The process of claim 23, wherein the seed crystals are produced by removing crystals in the first crystal structure from the solution and sizing the removed crystals to produce a seed crystal size fraction for reintroduction to the solution.

25. The process of claim 23, wherein a particle size of the feedstream is less than a particle size of the seed crystals after growth on the seed crystals.

26. The process of claim 23, wherein a range of a particle size of the seed crystals is not greater than about 3 standard sieve sizes.

27. The process of claim 23, wherein a particle size of the feedstream is less than about 150 mesh.

28. The process of claim 23, wherein a particle size of the seed crystals is from about 100 mesh to about 150 mesh.

29. The process of claim 23, wherein the step of relieving the supersaturation preferentially by rapid growth of existing crystals in the first crystal structure over nucleation further comprises periodically lowering the temperature of the solution by at least about 5° C.

30. The process of claim 23, wherein the step of relieving the supersaturation preferentially by rapid growth of crystals in the first crystal structure over nucleation comprises pausing feedstream addition at least about 10% of the time of crystallization.

31. The process of claim 23, wherein the amount of crystals in the solution formed by nucleation is maintained at about 20% by weight or less of the total solids of the compound in the solution.

32. The process of claim 23, wherein the amount of solids in the solution having a particle size of less than about 400 mesh is maintained at less than about 25% by weight of the total solids of the compound in the solution.

33. The process of claim 23, wherein the amount of solids in the solution in the form of agglomerates and/or aggregates is maintained at about 20% by weight or less of the total solids of the compound in the solution.

34. The process of claim 23, wherein the saturated solution is at a temperature above the atmospheric boiling point of the solution.

35. A process for producing a first crystal structure of a polymorphic compound from a feedstream comprising a second crystal structure form of the compound and impurities, the process comprising:
   (a) adding a feedstream comprising the second crystal structure form of the compound and impurities having a particle size of less than about 100 mesh to a saturated solution of the compound at a rate of at least about 400 g/l/min under a condition to create supersaturation of at least about 5 g/l;
   (b) preferentially relieving the supersaturation by growth of crystals in the first crystal structure over nucleation, wherein the step of relieving comprises adding seed crystals of the compound in the first crystal structure having a particle size of from about 150 mesh to about 100 mesh to the saturated solution, maintaining a solids content of at least about 17% and agitating the solution at an agitation index of at least about 4; and
   (c) recovering a portion of the crystals in the first crystal structure from the saturated solution, wherein said recovering step comprises removing a portion of the crystals in the first crystal structure from the solution, dispersing the crystals in the first crystal structure to a solids content of less than about 25% by weight by the addition of solution and recovering crystals in the first crystal structure having a particle size of greater than about 100 mesh from insoluble impurities on a size separation basis.

36. The process of claim 35, wherein the particle size of said feedstream is less than about 150 mesh.

37. The process of claim 36, wherein the saturated solution is at a temperature above the atmospheric boiling point of the solution.

* * * * *